US010877142B2

(12) United States Patent
Lundgren (10) Patent No.: US 10,877,142 B2
(45) Date of Patent: Dec. 29, 2020

(54) METHODS, SYSTEMS AND DEVICES TO AUGUR IMMINENT CATASTROPHIC EVENTS TO PERSONNEL AND ASSETS AND SOUND IMAGE A RADAR TARGET USING A RADAR'S RECEIVED DOPPLER AUDIO BUTTERFLY

(71) Applicant: Ronald Gene Lundgren, Highlands Ranch, CO (US)

(72) Inventor: Ronald Gene Lundgren, Highlands Ranch, CO (US)

( * ) Notice: Subject to any disclaimer, the term of this patent is extended or adjusted under 35 U.S.C. 154(b) by 162 days.

(21) Appl. No.: 16/234,291

(22) Filed: Dec. 27, 2018

(65) Prior Publication Data

US 2019/0146079 A1    May 16, 2019

Related U.S. Application Data

(60) Provisional application No. 62/616,605, filed on Jan. 12, 2018.

(51) Int. Cl.

| *G01S 13/86* | (2006.01) |
| *G01H 3/08* | (2006.01) |
| *G01S 13/58* | (2006.01) |
| *F41H 11/00* | (2006.01) |
| *G01S 13/524* | (2006.01) |

(52) U.S. Cl.
CPC .............. *G01S 13/86* (2013.01); *F41H 11/00* (2013.01); *G01H 3/08* (2013.01); *G01S 13/524* (2013.01); *G01S 13/581* (2013.01)

(58) Field of Classification Search
CPC ...... G01S 13/86; G01S 13/524; G01S 13/581; G01S 13/02; G01S 13/586; G01S 7/032; G01S 7/285; F41H 11/00; G01H 3/08
USPC ........ 342/115, 104, 106, 107, 109, 114, 118, 342/147, 73, 98, 99, 102
See application file for complete search history.

(56) References Cited

U.S. PATENT DOCUMENTS

| 3,614,785 | A | * | 10/1971 | Kratzer | G01S 13/64 |
| | | | | | 342/145 |
| 4,383,663 | A | * | 5/1983 | Nichols | F41G 7/008 |
| | | | | | 244/3.16 |
| 4,673,940 | A | * | 6/1987 | Barley | G01S 13/50 |
| | | | | | 342/104 |
| 4,717,916 | A | | 1/1988 | Adams | |
| 4,821,224 | A | * | 4/1989 | Liu | G06F 17/142 |
| | | | | | 708/401 |
| 4,823,139 | A | * | 4/1989 | Eisner | G01S 7/38 |
| | | | | | 342/15 |

(Continued)

FOREIGN PATENT DOCUMENTS

| CN | 101373563 A | 8/2008 |
| CN | 203759951 U | 3/2014 |

*Primary Examiner* — Justin M Jonaitis (57) ABSTRACT

Methods, systems, and devices utilizing the audio bandwidth Lorenz "Butterfly" effect to augur catastrophic events to personnel and assets, discriminate friendly from rogue or enemy combatants and their origins using the Lorenz "Butterfly" and further extracting the audio tune from the "Butterfly" and utilizing the information to audio image the target. This imaging technique provides an ultra-low-cost solution to identifying threats and augur their consequences to friendly military forces, civilian police and security forces and further protect large civilian gatherings.

2 Claims, 4 Drawing Sheets

(56) References Cited

U.S. PATENT DOCUMENTS

| | | | | |
|---|---|---|---|---|
| 4,886,069 A * | 12/1989 | O'Donnell | ......... | G01S 7/52046 |
| | | | | 600/457 |
| 5,422,829 A * | 6/1995 | Pollock | ................. | G01S 13/58 |
| | | | | 342/133 |
| 5,486,833 A * | 1/1996 | Barrett | ................... | G01S 7/414 |
| | | | | 342/204 |
| 5,694,347 A * | 12/1997 | Ireland | ................. | G06F 17/142 |
| | | | | 708/404 |
| 6,617,996 B2 * | 9/2003 | Johansson | ............... | G01V 3/12 |
| | | | | 342/118 |
| 2003/0223602 A1 | 12/2003 | Eichler | | |
| 2003/0231547 A1 | 12/2003 | Yang | | |
| 2011/0237939 A1 * | 9/2011 | Melamed | ................ | G06T 5/50 |
| | | | | 600/425 |
| 2015/0241555 A1 | 8/2015 | Lin et al. | | |
| 2017/0220522 A1 * | 8/2017 | Lerner | ................ | G06F 17/142 |
| 2017/0313331 A1 * | 11/2017 | Hilleary | ................ | B61L 17/02 |

\* cited by examiner

VOLCANO NEAR SANTA CRUZ DE TENERIFE TAKEN BY THE SPACE SHUTTLE

PENETRATING MISSILE BOMB

FIG. 4

METHODS, SYSTEMS AND DEVICES TO AUGUR IMMINENT CATASTROPHIC EVENTS TO PERSONNEL AND ASSETS AND SOUND IMAGE A RADAR TARGET USING A RADAR'S RECEIVED DOPPLER AUDIO BUTTERFLY

CROSS-REFERENCE TO RELATED APPLICATION

The present application claims priority to the earlier filed provisional application having Ser. No. 62/616,605 and hereby incorporates subject matter of the provisional application in its entirety.

TECHNICAL FIELD

The present specification relates to the use of the Lorenz "Butterfly" effect to identify threats and their sources and augur, that is foretell, catastrophic events that will endanger friendly personnel and assets, initiated by rogue or enemy combatants, thereby a priori defining the countermeasure required. This present invention is based on the very creative postulate that the Doppler audio bandwidth signal contains the Lorenz "Butterfly" and this does not intuitively follow from one skilled in the art of Doppler radar audio bandwidth signals, nor does it intuitively follow that this "Butterfly" will augur catastrophic events, in view of Lorenz's Chaos Theory's Corollary that "Present conditions determine future conditions within the Lyapunov time limit of predictability", and exactly sound image a radar target.

BACKGROUND

Figure 1:
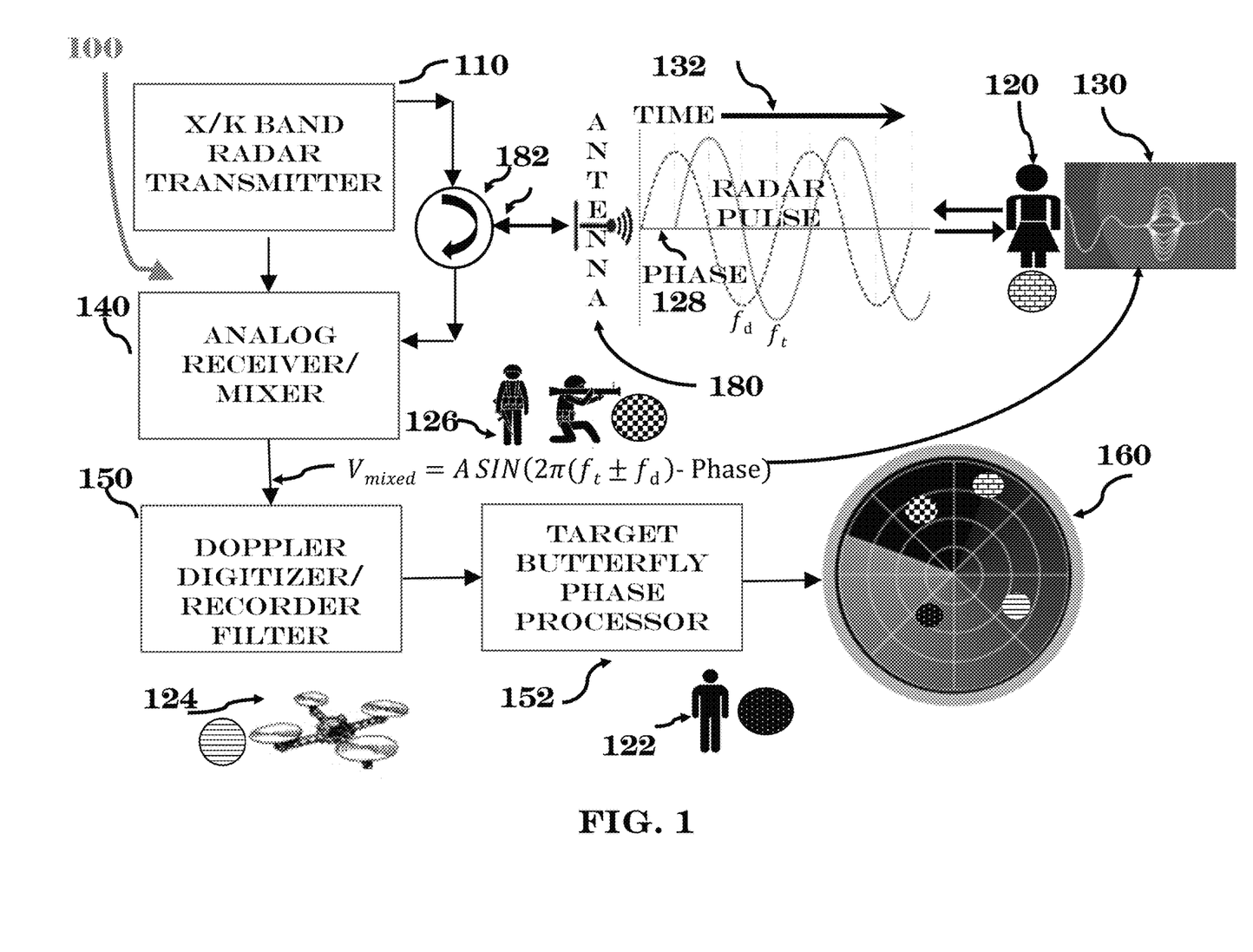
FIG. 1 depicts a single frequency low bandwidth X or K Band Radar illuminating targets, displaying the visual audio "Butterfly" and processing the Doppler audio digitally and identifying the target types and intent and displayed on a PPI Scope.
Figure 4:
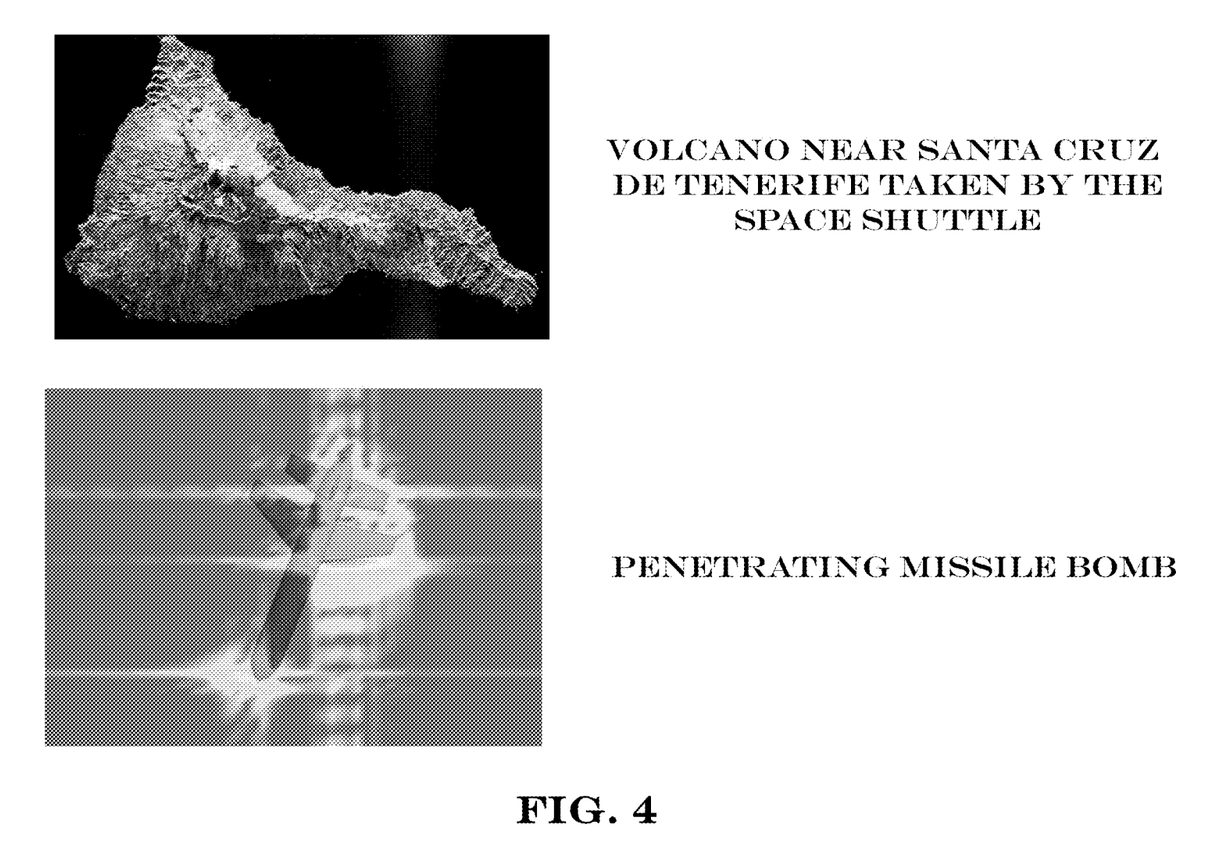
FIG. 4 depicts radar imaging of a volcano and a penetrating missile bomb.

Presently Doppler radars transmit a coherent, single frequency, signal, that is, the frequency of the transmission is known a priori. When this transmitted radar signal bounces off an object, referred to as the target, and is returned and detected by the radar's receiver, it has changed in amplitude and if the target is moving in frequency; which is detected by a phase change, recovered mathematically when mixed with a sample of the transmitted signal. Phase is defined as the positive going part of the returned signal starting at a different position in time relative to the transmitted signal and this phase change contains the Doppler frequency shift and further is represented mathematically by a complex number which has two parts; The Real (R) part which is the signal magnitude or amplitude and contains no phase, that is frequency, information and the imaginary (i) part which contains the phase, that is frequency, information with which one can derive the Doppler frequency $f_d$ shown in FIG. 1. In Radar technology the R and (i) terms are defined as I/Q data where I is the R part of the complex number and Q is the imaginary (i) part. Put simply, I/Q data shows the changes in the return signal, that is amplitude and phase of the returned transmitted wave radar signal versus the original transmitted signal, that has bounced off a target object as shown in FIG. 1. In basic terms the transmitter transmits complex numbers and the receiver receives the complex numbers of the radar return signal and these complex numbers are not only different but are target definition rich in two primary ways:

1) The complex numbers define the Radar Cross Section (RCS) also known as the scattering cross section, defined by the Greek letter sigma (σ) of a target. The RCS of a target is a measure of the amount of power that is returned from a target, that is re-radiated by a target that has absorbed the incident power, to a radar receiver when the target is illuminated by a coherent radar beam. It is a fictitious geometric area and bears little resemblance to the physical area of a target. It is however proportional to the amplitude and phase of the return signal, that is, the complex number; and in this manner, describes the targets' geometry and material properties. In the case of today's RCS measurements, each signal return from a point on the target body (a woman as an example in FIG. 1) is 4 complex numbers to account for the direction that the returned electric field wave signal strikes the receiving antenna. To image a radar target each set of complex numbers must be acquired as the target is moved 360 degrees, or $2\pi$ radians, in azimuth relative to the radar transmitter or the radar is moved in azimuth relative to the radar target. Today adequate resolution requires that the azimuth step be 0.002 radians and at each azimuth step the target must be accordingly stepped thru a large bandwidth; for X-band imaging this is a 10 MHz step between 8 to 12 GHz. Thru each of these steps 4 complex numbers are obtained. These complex numbers are assembled into 2×2 matrices called the scattering matrices. The matrix is then mathematically manipulated to represent the square root of the RCS with each complex number having units of length (meters in the MKS system) and in a simply amazing mathematical extraction now is able to obtain not only the amplitude of the returned power, that is its RCS, but both the material properties of the target and its media (normally air) that the radar transmitted and returned wave have traversed and the location of the target and its velocity toward or away from an antenna. The information is so rich that it is currently used as shown in FIG. 4 to terrain map or identify real threat missiles versus decoy missiles meant to confuse a foe's defenses. The "trick" is that either the radar or the target must be moving toward or away from the observing antenna to generate this information. Therefore, the basics of this operation is the Doppler effect. The definition for this valuable operation is radar imaging, however it requires, as noted above in the X-Band case, high bandwidth (range of frequencies) illumination of a target in order to properly image and identify exactly the target and further expensive multimillion-dollar radar facilities to acquire the scattering matrices. In theory, this could all be determined by applying the Scottish physicist James Clerk Maxwell's equations and the proper boundary conditions. In practice, except for simple shapes like spheres, or shapes that can be made from simple shapes, the RCS information from a target must be obtained thru tests and cataloged so that received low bandwidth information from single frequency radars can identify and image a target. This is an expensive process and billions of dollars have been spent cataloging radar target threats of interest by the Department of Defense (DoD). Generally, DoD targets are threats such as nuclear tipped Intercontinental Ballistic Missiles (ICBMs); however presently they also include todays commercial Drones known as small un-manned aerial vehicles (sUAS). As an example, balloons are used as decoys to confuse a foe's defenses into thinking they are being attacked by multiple missiles; their job now to determine which one to neutralize. Imaging a single balloon so that a single frequency radar can identify it versus the real missile is approximately $500,000 per balloon/decoy.

2) This basic Doppler effect of a relative velocity between the transmitting antenna and the target also returns a singular number, that constitutes the return of the target body as a whole to the receiver and consisting of a change in amplitude and frequency, where the frequency change is detected by the phase change, mathematically obtained by mixing a sample of the transmitted signal with the return signal, that is proportional to the frequency change; which is the value of the complex numbers' imaginary (i) part that is constant for a non-moving target but will vary for a moving target, that is, the singular complex number returned compared to the complex number transmitted per radar pulse is different and the difference in frequency is in the audio bandwidth, that is, 20 Hz to 20,000 Hz. In this invention an existing low bandwidth single frequency (8 to 12 GHz X or 12 to 40 GHz K Band) radar transmitter recovers the targets Doppler audio signature, thereby imaging the target by sound. This sound image is then, by use of a digital discriminator and distiller, compared to previously identified sound images, obtained thru experimentation, to discriminate the matching sound image. These previously experimentally obtained sound images are stored at OSTI.gov. Example stored sound images are sea mammals, submarines, armed soldiers and squads, missiles, tanks and more. However, since the art typically engages in this type of experimentation and result's storage, it is not undue experimentation to the Practitioner of this art to simply obtain the image thru experimentation rather than engage in protracted searches thru Government data bases. Further it is the imaginary (i) part of the complex number that contains the frequency information. This imaginary (i) part measures the shift in the frequency of the returned versus the transmitted signal to the receiver. A common description of the Doppler effect is a train's whistle tone has a higher frequency when the train is approaching versus being stationary, as the sound waves are compressed when striking the receiver (ear) of an observer, but the tone lowers in frequency as the train recedes and the sound waves elongate when striking the observer's receiver (ear). The initial received magnitude (R) part of the complex number, not the comparison from pulse to pulse, is used for radar receiver design to make sure the complex number return power does not fall into the noise associated with a receiver and therefore can be adequately discriminated by the receiver from the noise level. The process to detect the phase change and therefore the Doppler frequency from the noise is known as differencing. That is, the received complex number is subtracted from the incident illumination's complex number. Differencing is a method used in electronics to detect low level signals and is highly effective. When combined with radar discrimination (one knows the frequency they are looking for) it vastly increases signal to noise ratio allowing very very low-level return signals, that is, signals with a small R value, to be identified. The physical analog to this is again a train. A differencing circuit that assures the signal is not lost in the noise is called a "Boxcar Detector", as this circuit is defined analogously as being able to detect the clanking together of train boxcars from the overall noise of a moving train. The key to this radar complex number differencing operation is that the result falls into the audio bandwidth. That is, the sounds or music chords played, of a target, caused by the target vibrations due to its movement, are resolved. operation is that the result falls into the audio bandwidth. That is, the sounds or music chords played, of a target, caused by the target vibrations due to its movement, are resolved.

Early Doppler radars as well as todays use the difference in phase to display the target on an indicating scope. One type of indicating scope used is called an A-Scope, which is an oscilloscope as it will display bi-polar signals, that is, voltage signals that go positive and negative. As an example, a drone flying at 100 MPH coming toward you will generate a frequency difference from a single frequency transmitted signal of 10 GHz, of substantially 3500 Hz. A walking person will generate a frequency difference of substantially 200 Hz. The Bandwidth, as stated, is in the audio spectra and is small but quite sufficient. Successive sweeps of a Doppler radar displayed on an A-Scope and super positioned will create a "Butterfly" displayed for the radar operator to easily see. The change in frequency (phase) changes the amplitude of each radar transmitter's pulse target return signal if it is moving and is a form of video differencing. Returns from non-moving targets remain static and from sweep to sweep of equal amplitude; reference FIG. 2 for a visual of a displayed Doppler audio signal "Butterfly" on a radar A-Scope. This Doppler audio signal is the vibration of a target, which is changed to sound, and is dependent on the geometry and mass properties of a target. These vibrations are caused by the uniqueness of a target. As an example, a woman's geometry is wholly different than a man's. Accordingly, a woman moving gives off different sound chords, that is, plays a different tune then a man and this difference is the difference in the vibrations of a man's body versus a woman's body. As an audio analogy each moving target based on its geometry, mass properties and vibrations due to its movement will play a different tune. These tunes are unique just as today every song tune conceived is different unless it is a copy of itself. Accordingly, each target has associated with it a unique "Butterfly" pattern that defines the target. Thus, a single frequency, low bandwidth and inexpensive Doppler audio "Butterfly" can be used as an expedient to high bandwidth RCS and expensive RCS measuring facilities to identify uniquely and sound image a radar target by utilizing its sound (tune) as the identifier.

In addition to identifying uniquely a radar target, Doppler audio in this invention is used as an augur (messenger) to predict future catastrophic events. Lorenz's Chaos Theory states unique perturbations in initial conditions foretell future events. This is called the "Butterfly" effect as in the limit a butterfly's wings flapping will generate the initial conditions that start the formation of large even catastrophic weather systems such as hurricanes. A radar's video "Butterfly" is a visual of the buried audio spectral content (its sound chords) and the minor perturbation in the initial conditions of a moving target. The spectra are dependent on the unique properties of the target as it is a measure of a moving target's geometry and mass properties and unique movement generated vibrations; which when digitally extracted by differencing fall into the audio spectra. This uniqueness expands the bandwidth of the system allowing highly resolved visuals of the target and its contents. Doppler audio "Butterflies" will distinguish armed combatants from refugees thereby predicating the intent of the target. Further a Rocket Propelled Grenade (RPG) is one of the deadliest weapons used against armored/un-armored vehicles and personnel carrier convoys. RPGs are impossible to defeat in flight after launch. The attacker simply sneaks up within 300 meters of a target, loads a substantially 6-pound rocket into a launcher and fires into the target. Attempts at counters such as intercepting the rocket before it strikes a target have all failed due to the small reaction time of a counter allotted after an enemy combatant has positioned himself for launch from a strategic position. Some systems have used reverse, called back, explosive blasts to counter an RPG. However, these systems put the friendly force at risk of the enemy turning the explosive counter back on the friendly force and they are highly complicated subjecting them to failure or false positives, again turning the counter against the friendly force and further require the friendly force to spend their assets taking care of their counter system rather than fulfilling their primary mission. However, due to the weight and size of an RPG a combatant carrying an RPG is easily distinguishable from a combatant not carrying an RPG by the Lorenz "Butterfly", that is the sound chords played, as their "Butterfly" pattern is unique or in the music analog the tune played is wholly different from someone not carrying an RPG. The RPG changes one's mass properties as one moves toward a target to a launch position thereby producing unique distinct vibrations (sounds) that are a direct function of the geometry and mass properties of the carried RPG. The identification is so exact that the RPG carrier cannot be confused with refugees, casuals, or other soldiers with other armament. In this way the "Butterfly" pattern predicts a future catastrophic event thereby allowing the friendly force the time to counter and obviate the threat as the enemy are identified during set up operations.

In addition to countering an RPG with a "Butterfly" augur a host of other applications are a result from the Doppler audio "Butterfly" effect. As an example, it is well known that a nuclear tipped ICBM is best countered on the launch pad rather than in flight were counters are either ineffective due the speed of the ICBM or require resources topping 10's of billions of dollars in assets to counter just one ICBM. The enemy has then only to play the shell game to counter the counter. Consider an enemy setting up for a nuclear ICBM launch. Satellite photos will detect this setup days if not weeks before the launch however the satellites cannot tell if this is part of a shell game. This is though the ideal time to counter a true nuclear ICBM launch as one can now exactly obviate the threat by destroying the launch preparations. However, the vibration (sounds) that emanate from setup of an ICBM produce unique "Butterflies" that cannot be confused with space launches or commercial communication's satellite launches or an enemy shell game. Further, consider a modern commercial ship, such as a Cruise ship, that uses radar to navigate the seas and for vessel collision avoidance. It depends for a large part on other vessels to identify their size, weight and power characteristics and registration by sending out an identification signal. Of course, rogue vessels intent on harm, small vessels, or vessels experiencing failures or not following the rules of navigation will not send out the identification signal. The Doppler Audio "Butterfly" obviates the need for the target vessel to identify itself as the size, weight and power characteristics are identified a priori by the Doppler Audio "Butterfly". In this manner a vessel attempting to remain stealth's intent and threat are derived and the catastrophic results of a collision with the other vessel is predicted in time for avoidance measures to be taken.

Further the source of this invention is already integral to commercial and military X and K Band Doppler radars. It is a gift from a single frequency low bandwidth Doppler radar and only requires interdiction of the return signal and digital extraction and processing of the interdicted signal to include this inventions methods', systems' and devices' to augur imminent catastrophic events to personnel and equipment assets and discriminate friendly from rogue or enemy combatants and their origins using the Doppler audio "Butterfly" radar return and define the scope of the threat event and the counter measure required to obviate the threat.

Accordingly, a need exists for processing a single frequency, low bandwidth and existing Doppler radar's audio signal and extracting the Lorenz "Butterfly" that is, the minor perturbations in initial conditions changed to sounds from a target to beneficially augur imminent catastrophic events to personnel and assets and discriminate friendly from rogue or enemy combatants and their origins using the Doppler audio "Butterfly" radar return and define the scope of the threat event and the counter measure required to obviate the threat.

SUMMARY

In the preferred embodiments, an X or K Band commercial or military Doppler Radar "Butterfly" pattern is extracted and processed to identify a radar target's size, weight, and type and in the further embodiment the "Butterfly" is processed to identify personnel carrying RPGs and via the "Butterfly" effect augur the set-up and execution of an RPG attack on friendly forces in sufficient time for the defending forces to counter the attack.

BRIEF DESCRIPTION OF DRAWINGS

The embodiment set forth in the drawings are illustrative and exemplary in nature and not intended to limit the subject matter defined by the claims. The following brief description of the illustrative embodiments can be understood when read in conjunction with the following drawings.

DETAILED DESCRIPTION OF DRAWINGS

FIG. 1 depicts a single frequency low bandwidth X or K Band transmitter system 100 illuminating targets 120, 122, 124 and 126, displaying the visual audio "Butterfly" 130 that has been recovered from the phase change 128 and processing this Doppler audio digitally, 150, and annunciating the targets on a PPI Scope 160. The X/K Band Transmitter 110 feeds an Antenna 180 which illuminates a woman 120, a man 122, a drone 124 and combatants 126 carrying an RPG. The reflected illumination of Doppler frequency $f_d$, dotted line, and transmitted illumination signal of frequency $f_t$, solid line, are shown graphically, 132, leaving the antenna at higher amplitude and returning to the antenna at lower amplitude respectively. The two signals are shown, for simplicity and ease of graphing, with a phase shift, 128, defined as the positive going portion of the transmitted pulse occurring at a different time than the positive portion of the received pulse. This is the standard definition in radar technology of phase and it is this time difference that reveals the Doppler frequency. A switch 182 diverts the reflected signal to the Analog Receiver/Mixer 140 where it is mixed with a sample of the transmitted signal 110. The mixed signal output, $V_{mixed}$, is then sent to the Digitizer/Filter 150 where the mixed signal 140 sum of the two frequencies is removed and the mixed signal filtered to retain only the Doppler audio bandwidth "Butterfly" 130 which is the difference of the two frequencies. The "Butterfly" 130, which is now a sound image, that is, the tones, cords, octaves, triad and dyad beats that when played display the unique tune associated with a target, is sent to the "Butterfly"

processor 152 where the targets and their intent are displayed on a PPI scope 160 graphically. Processor 152 is a digital ear that digitally discriminates and distills unique tunes associated with a specific target. A simple example is the co-axial rotor attack helicopter, one of the fastest and most maneuverable attack aircraft due to the two co-axial contra-rotating rotors. These main lift and power rotors move in opposite directions thereby producing musical DYADS, that is, a beat of sets of superimposed notes/pitches that are classified by the pitch interval between the notes. The "Butterfly" processor digital ear simply discriminates (compares) the incoming DYAD tune wave form to stored, in catalogue form, DYAD tunes of co-axial rotor attack helicopters to identify the make, model, and weaponry of the incoming attack threat.

Figure 2:
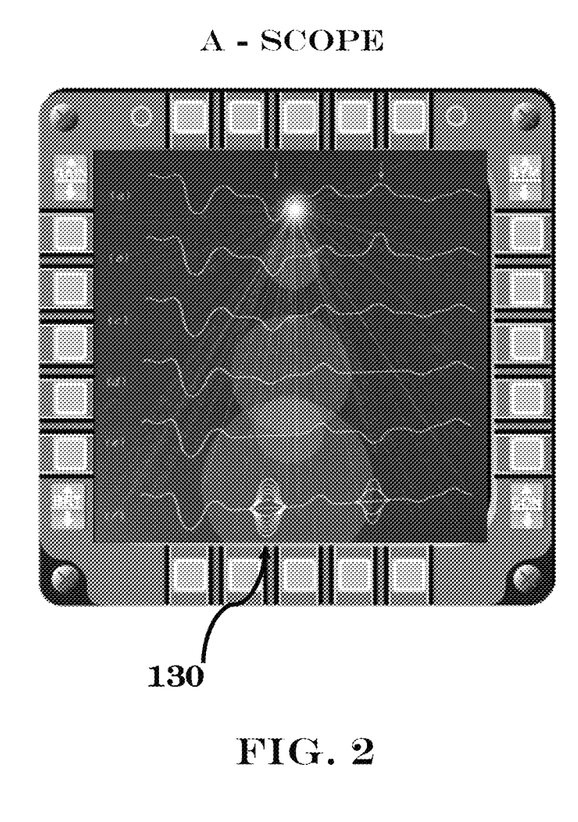
FIG. 2 depicts a radar operator view of the Lorenz "Butterfly" pattern on a Radar A-Scope.

FIG. 2 depicts an A-Scope which has displayed the video difference of the transmitted and received signals and create a visual of the Lorenz "Butterfly".

Figure 3:
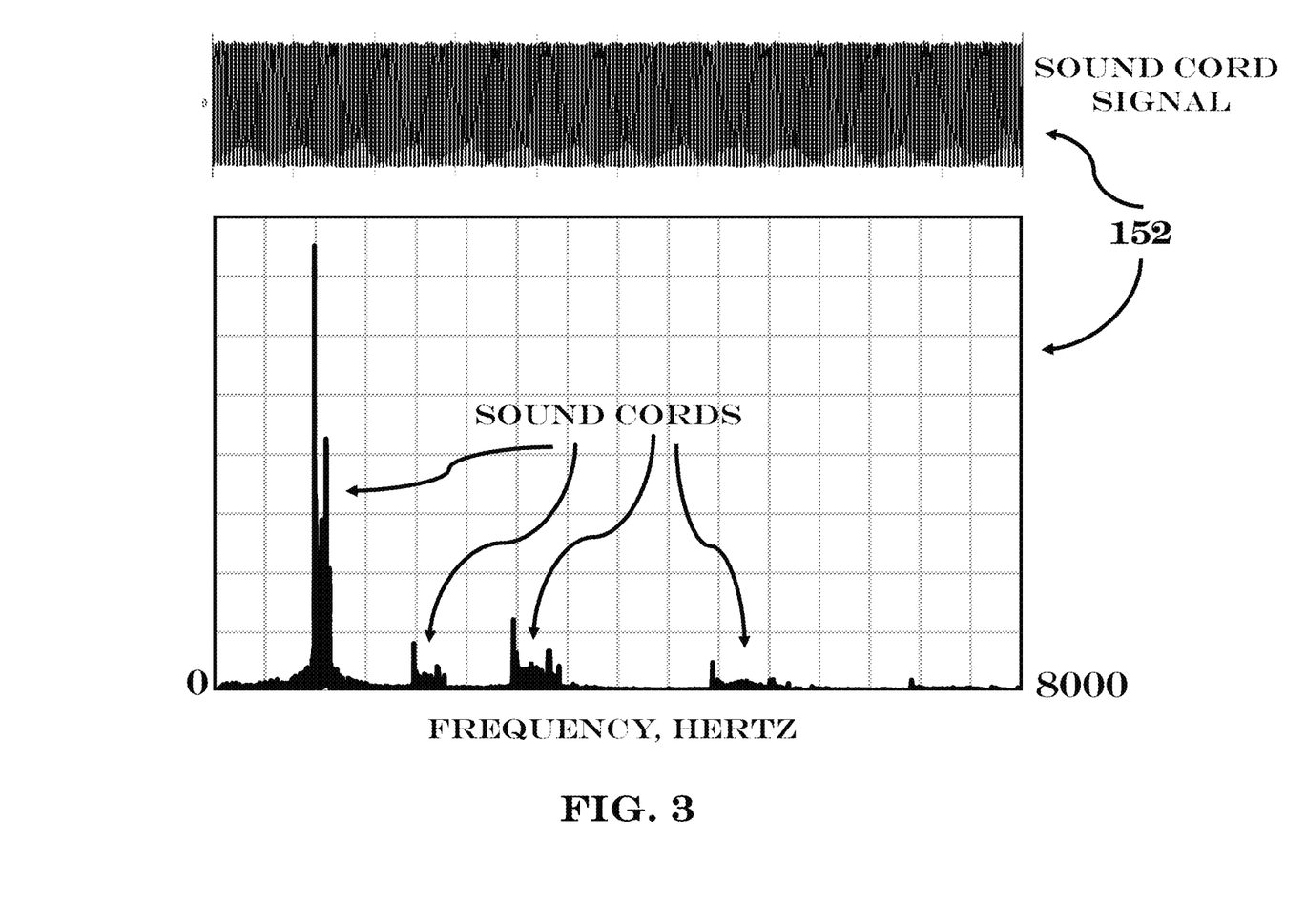
FIG. 3 displays the sound signal and graphs the sound chords played by a platform object traveling 40 MPH toward a Ku band radar and carrying a 5 MPH runner on the platform moving toward the radar.

FIG. 3 depicts example data results, from a platform moving 40 mph with a 5 mph runner on the platform, out of the processor 152 that shows the distinct sound tune signal for the example and the sound cords generated for this example.

FIG. 4 shows the power of radar imaging to resolve threats such as penetrating missile bombs and the terrain mapping feature of radar imaging; the figure shows a volcano radar imaged in Mexico and missile in flight.

What is claimed is:

1. A method to extract an audio bandwidth Lorenz "Butterfly" from a Doppler pulse radar, consisting of an X/K band radar transmitter, a moving target for a transmitter's illumination pulse, an antenna to broadcast the illumination pulse to the moving target and gather the returned reflected illumination pulse of the moving target, an analog receiver/mixer to receive the moving target returned reflected illumination pulse from a diverter switch and mix the moving target returned reflected illumination pulse with an a priori sample of the transmitted illumination pulse, a Doppler digitizer/recorder filter to digitize a result of the analog receiver/mixer and filter the result to recover the audio bandwidth Lorenz "Butterfly", a target "Butterfly" phase processor to recover a sound image of the moving target and discriminate and distill the returned reflected sound image from a catalog of the a priori collected moving target sound images and a PPI scope application to display graphically the moving target and annunciate and identify the moving target and its features by:

Interdicting the X/K band radar transmitter's moving target's returned reflected illumination pulse that has echoed from the moving target and is made up of a stream of complex number I/Q values received from the moving target acquired by the X/K Band radar's analog receiver/mixer and has been mixed with the a priori sample of the X/K band radar's transmitted illumination pulse to acquire a difference and a sum of the transmitted and the returned reflected illumination pulse;

Filter within the Doppler digitizer/recorder filter the mixing result digitally to remove the sum of the transmitted and the returned reflected illumination pulse and reveal a relative phase change, which is the starting position of the Doppler pulse radar's return reflected illumination pulse's, from the moving target, positive going voltage portion relative to the transmitted a priori samples' starting positive going voltage portion, and thereby recording digitally the audio bandwidth Lorenz "Butterfly" sound image contained therein;

Identifying within the target "butterfly" phase processor the unique sound image tune comprised of chords, tones and their octaves and triad and dyad beats contained within the audio bandwidth Lorenz "Butterfly" sound image by discriminating and distilling the returned reflected illumination pulse against the catalog of the a priori collected moving target sound images thereby sound imaging the moving target and identifying the moving target and its features on the PPI scope application graphically, thereby annunciating the identification of the moving target.

2. A method to extract an audio bandwidth Lorenz "Butterfly" from a Doppler pulse radar, consisting of an X/K band radar transmitter, a moving target for a transmitter's illumination pulse, an antenna to broadcast the illumination pulse to the moving target and gather the returned reflected illumination pulse of the moving target, an analog receiver/mixer to receive the moving target returned reflected illumination pulse from a diverter switch and mix the moving target returned reflected illumination pulse with an a priori sample of the transmitted illumination pulse, a Doppler digitizer/recorder filter to digitize a result of the analog receiver/mixer and filter the result to recover the audio bandwidth Lorenz "Butterfly", a target "Butterfly" phase processor to recover a sound image of the moving target and discriminate and distill the returned reflected sound image from a catalog of the a priori collected moving target sound images and a PPI scope application to display graphically the moving target and annunciate and identify the moving target and its features by:

Interdicting the X/K band radar transmitter's moving target's returned reflected illumination pulse that has echoed from the moving target and is made up of a stream of complex number I/Q values received from the moving target acquired by the X/K Band radar's analog receiver/mixer and has been mixed with the a priori sample of the X/K band radar's transmitted illumination pulse to acquire a difference and a sum of the transmitted and the returned reflected illumination pulse;

Filter within the Doppler digitizer/recorder filter the mixing result digitally to remove the sum of the transmitted and the returned reflected illumination pulse and reveal a relative phase change, which is the starting position of the Doppler pulse radar's return reflected illumination pulse's, from the moving target, positive going voltage portion relative to the transmitted a priori samples' starting positive going voltage portion, and thereby recording digitally the audio bandwidth Lorenz "Butterfly" sound image contained therein;

Identifying within the moving target "butterfly" phase processor the unique symphony sound image comprised of chords, tones and their octaves and triad and dyad beats contained within the audio bandwidth Lorenz "Butterfly" by digitally discriminating, distilling and comparing the sound image to the a priori RPG catalog sound image of combatant set up and movement readying for an attack against a friendly force, a software generated RPG sound image or recovery of the RPG sound image thru an experiment thereby implementing a Lorenz Chaos Theory Corollary that present conditions predict future conditions within a Lyapunov time limit of predictability thereby predicating a catastrophic event to the friendly force heavily armored and lightly armored convoys and personal carriers prior to the attack thereby allowing the friendly forces to identify a required counter-measure to fully neutralize a threat in advance of the attack.

\* \* \* \* \*